No. 779,110. PATENTED JAN. 3, 1905.
N. M. ANDERSEN.
BREAD CUTTING DEVICE.
APPLICATION FILED MAY 24, 1904.
2 SHEETS—SHEET 1.
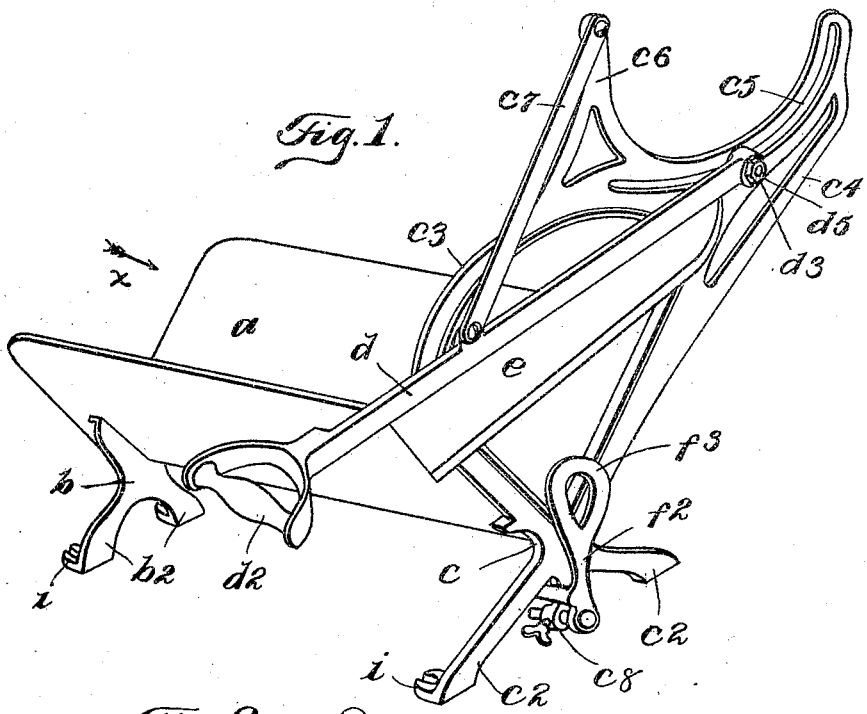
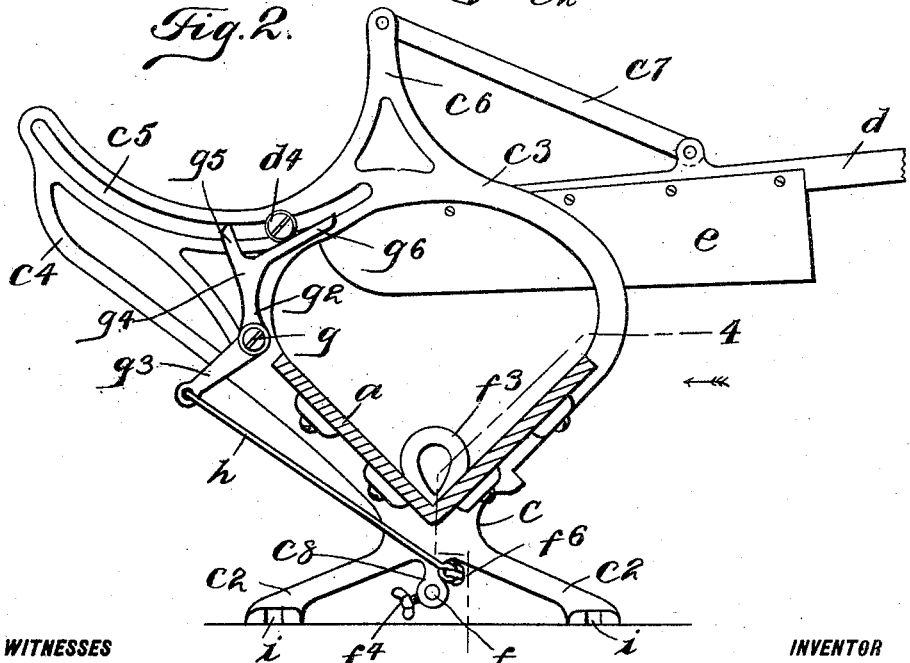
WITNESSES
INVENTOR
Niels M. Andersen,
BY
ATTORNEYS No. 779,110. PATENTED JAN. 3, 1905.
N. M. ANDERSEN.
BREAD CUTTING DEVICE.
APPLICATION FILED MAY 24, 1904.
2 SHEETS—SHEET 2.
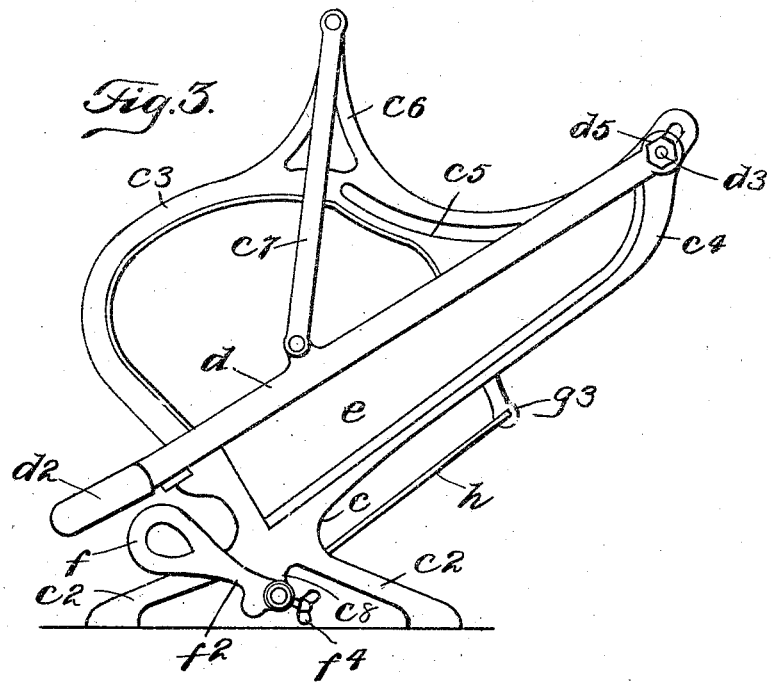
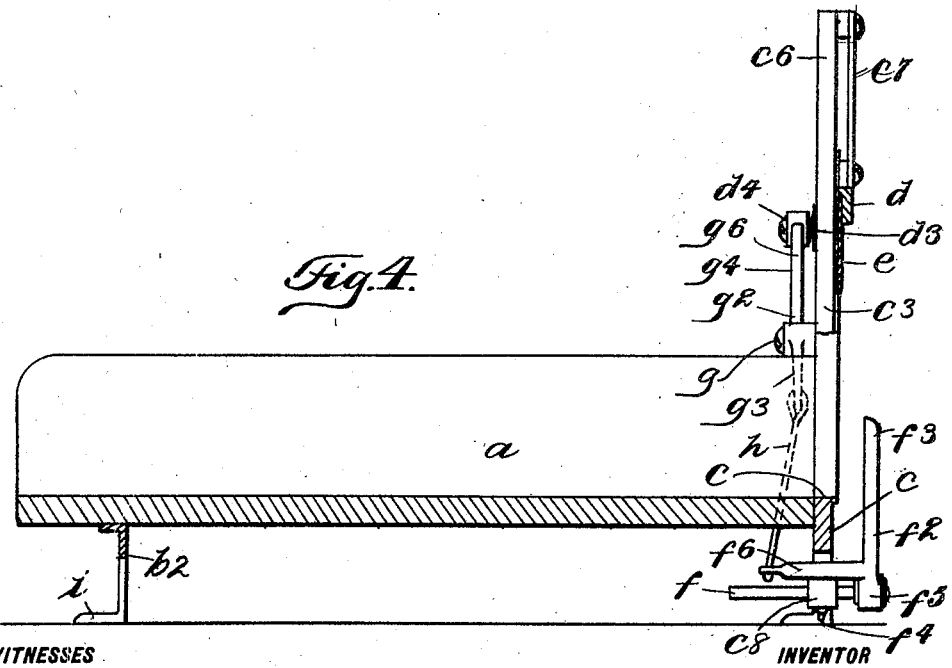

No. 779,110. Patented January 3, 1905.

UNITED STATES PATENT OFFICE.

NIELS M. ANDERSEN, OF BROOKLYN, NEW YORK.

BREAD-CUTTING DEVICE.

SPECIFICATION forming part of Letters Patent No. 779,110, dated January 3, 1905.

Application filed May 24, 1904. Serial No. 209,586.

*To all whom it may concern:*

Be it known that I, NIELS M. ANDERSEN, a citizen of the United States, residing at Brooklyn, in the county of Kings and State of New York, have invented certain new and useful Improvements in Bread-Cutting Devices, of which the following is a specification, such as will enable those skilled in the art to which it appertains to make and use the same.

The object of this invention is to provide an improved device for cutting bread which is simple in construction and operation and by means of which a loaf of bread may be quickly and easily cut into slices, all of which will be exactly of the same thickness, a further object being to provide a device of this class by which many other substances as well as bread may be cut into slices in a similar manner; and with these and other objects in view the invention consists in a device of the class specified constructed as hereinafter described and claimed.

Figure 1 is a perspective view of my improved bread-cutting device; Fig. 2, a sectional end view looking in the direction of the arrow $x$ of Fig. 1; Fig. 3, an end view opposite to that of Fig. 2 and showing the parts in a different position, and Fig. 4 a partial section on the line 4 4 of Fig. 3.

In the practice of my invention I provide a tray $a$, which is V-shaped in cross-section and preferably open at both ends and one end of which is provided with a V-shaped support $b$, having legs $b^2$, and to the other end of which is secured a V-shaped frame or support $c$, having legs $c^2$ and a curved or circular crown-piece or top portion $c^3$ and the back side of which is extended to form an arm $c^4$, having a segmental or curved slot $c^5$ formed partially in said arm and partially in the top or crown-piece $c^3$. The top or crown-piece $c^3$ of the frame $c$ is also provided with an upwardly directed member $c^6$, to which is pivoted a link $c^7$, which is also pivoted to a bar $d$, to which is secured a blade $e$, and the bar $d$ is provided at one end with a handle $d^2$ and at the opposite end with a pin, screw, or bolt $d^3$, which passes through the slot $c^5$ and is free to move therein.

Mounted in the base portion of the support $c$ or in a hanger $c^8$, connected therewith and movable through said hanger parallel with the bottom of the tray $a$, is a shaft or rod $f$, provided at its outer end with an upwardly-directed arm $f^2$, having in the form of construction shown an enlarged upper end portion or plate $f^3$, and the position of the rod $f$ in the hanger $c^8$ or in the bottom central portion of the support $c$ may be regulated by means of a set-screw $f^4$. The arm $f^2$ is provided with a head $f^5$, through which the rod $f$ passes and by means of which said arm is secured to said rod, and the head $f^5$ or the arm $f^2$ adjacent to said head is provided with a supplemental arm $f^6$, which projects inwardly under the tray $a$ and parallel with the rod $f$ and slightly over and to the left of said rod in the form of construction shown.

Pivoted to the back top portion of the support $c$ or to the arm $c^4$ where it connects with said support, as shown at $g$, is a crank-lever $g^2$, one end of which projects downwardly and backwardly to form an arm $g^3$, while the other end of which extends upwardly to form an arm $g^4$, provided with a short finger $g^5$, which ranges substantially in line with the arm $g^4$ and in the position of the parts shown in Fig. 2 crosses the slot $c^5$ in the arm $c^4$, and a longer finger $g^6$, which projects forwardly and substantially at right angles to the finger $g^5$.

The pin, screw, or bolt $d^3$, which passes through the slot $c^5$ in the arm $c^4$ and with one end of which the bar $d$ is connected, is provided at one end with a head $d^4$ in the form of construction shown and the other end with a nut $d^5$, and the head $d^4$ operates, as hereinafter described, in connection with the fingers $g^5$ and $g^6$ of the arm $g^4$ of the crank-lever $g^2$. Loosely or pivotally connected with the arm $g^3$ of the crank-lever $g^2$ is a link or rod $h$, one end of which is loosely or pivotally connected with the inner end of the supplemental arm $f^6$, and when the parts are in the position shown in Figs. 1 and 2 the arm $f^2$ is in a vertical position, and the enlarged upper end or plate $f^3$ thereof extends vertically in front of the tray $a$.

The operation will be readily understood from the foregoing description when taken in connection with the accompanying drawings and the following statement thereof. It will be understood, of course, that the device is secured to a table or other support to which the legs $b^2$ and $c^2$ are secured by means of bolts or screws passed through the feet $i$ of said legs or in any desired manner, and when it is desired to slice a loaf of bread the loaf of bread is placed in the tray $a$ and is held in or by the left hand, and the handle of the knife $e$, consisting of the bar $d$ and handle member $d^2$, is raised, as shown in Figs. 1 and 2, or higher, if desired. The loaf of bread is then moved forwardly until the end thereof strikes the upper end of the arm $f$, which constitutes a gage to regulate the thickness of the slices of bread to be cut. The knife is then depressed into the position shown in Fig. 3, and in this operation a slice of bread is cut from the loaf, and at the same time the gage-arm $f^2$ is turned into the position shown in Fig. 3, and the slice falls onto the table or into a suitable receiver placed under the end of the tray. In this operation the head or end of the bolt, screw, or pin $d^3$ strikes the finger $g^5$ of the arm $g^4$ of the crank-lever $g^2$ and forces the arm $g^3$ of said lever downwardly and forwardly, and this operation, as will be understood, forces the arm $f^2$ into the position shown in Fig. 3, and when the knife is again raised the head $d^4$ of the screw, pin, or bolt $d^3$ operates in connection with the finger $g^6$ of the arm $g^4$ of the lever $g^2$ and raises the arm $f^2$ into the position shown in Figs. 1 and 2. It will be understood, of course, that the thickness of the slices of bread is regulated by adjusting the rod $f$ in its support $c^3$, which is done by means of the set-screw $f^4$, and in this manner the distance between the arm $f^2$ and the end of the tray may be regulated to any desired extent.

It will be apparent that this device may be used for slicing or cutting many other articles as well as bread, and my invention is not limited to the exact details of construction herein shown and described, and I reserve the right to make all such alterations therein as fairly come within the scope of the invention.

Having fully described my invention, what I claim as new, and desire to secure by Letters Patent, is—

1. A bread-cutting device, comprising a suitable tray provided at one end with a V-shaped frame or support, said frame or support being provided with a top portion and a backwardly-directed arm, the top portion being also provided with an upwardly-directed member, and said arm and top portion with a curved slot, a link pivoted to the upwardly-directed member of the top portion, a knife pivotally connected with said link and provided at one end with a pin which passes through and is movable in said slot and at the other end with a handle, a crank-lever pivoted to the back portion of the frame or support and provided with two fingers in connection with which the end of said pin operates, a rod mounted in the bottom portion of the frame or support below the tray and adjustable toward and from the tray and provided at its outer end with an upwardly-directed gage-arm, a supplemental arm connected with said gage-arm and projecting backwardly beneath the frame or support and a rod loosely connected with said crank-lever and with said supplemental arm, substantially as shown and described.

2. A bread-cutting device, comprising a tray provided at one end with an open frame having an upwardly-directed member and a backwardly-directed arm, said member and said arm being provided with a curved slot, a link pivoted to a support at the top of said member, a knife-bar pivoted to said link and provided with a pin movable in said slot, a crank-lever mounted at the back of the frame or support and adapted to be operated by said pin, a gage mounted in the bottom of said frame or support below the tray and adapted to turn in a vertical plane and adjustable toward and from the tray and provided with an arm which passes backwardly beneath the tray, and a link or rod connected with said crank-lever and with said arm, substantially as shown and described.

In testimony that I claim the foregoing as my invention I have signed my name, in presence of the subscribing witnesses, this 23d day of May, 1904.

NIELS M. ANDERSEN.

Witnesses:
F. A. STEWART,
C. J. KLEIN.